United States Patent [19]

Gillis

[11] Patent Number: 5,187,205

[45] Date of Patent: Feb. 16, 1993

[54] COMPATIBLE ISOCYANATE REACTIVE COMPOUNDS

[75] Inventor: Herbert R. Gillis, Sterling Heights, Mich.

[73] Assignee: Imperial Chemical Industries PLC, London, England

[21] Appl. No.: 745,340

[22] Filed: Aug. 15, 1991

[30] Foreign Application Priority Data

Aug. 16, 1990 [GB] United Kingdom ............... 9018046

[51] Int. Cl.$^5$ .............................................. C08G 18/14
[52] U.S. Cl. .................................... 501/129; 521/163; 524/714; 524/718; 524/722; 528/44; 528/52; 528/53; 528/54; 528/73; 528/49; 252/182.25; 252/182.26
[58] Field of Search ................ 521/129, 163; 524/714, 524/718, 722; 528/44, 52, 53, 54, 73, 49; 252/182.25, 182.26

[56] References Cited

U.S. PATENT DOCUMENTS 4,847,307 7/1989 Dewhurst et al. ..................... 528/53
4,880,846 11/1989 Tufts et al. .............................. 528/76
5,055,134 10/1991 Cassidy et al. ................... 106/38.22

FOREIGN PATENT DOCUMENTS 069295 1/1983 European Pat. Off. .
339792 11/1989 European Pat. Off. .
1564939 4/1969 France .
2222594 9/1988 United Kingdom .

Primary Examiner—Maurice J. Welsh
Attorney, Agent, or Firm—Cushman, Darby & Cushman

[57] ABSTRACT

An isocyanate-reactive composition having a plurality of isocyanate-reactive groups comprising:
(i) at least one polyol having a number average molecular weight of from 2000 to 12,000;
(ii) at least one low molecular weight polyol, including water, immiscible in said high molecular weight compound and having a molecular weight in the range of 18–500; and
(iii) a compatibilizing amount of an amidine compound of the Formula (1)

$$R^4-N-\overset{\overset{\displaystyle R^1}{|}}{C}=N-R^3 \quad (1)$$
$$\phantom{R^4-N-}\overset{\displaystyle |}{\phantom{C}}\overset{\displaystyle R^2}{\phantom{=}}$$

wherein each of $R^1$ to $R^4$ represent H or, independently or together, an organic radical selected from:
(a) alkyl radicals having 1 to 25 carbon atoms;
(b) cyclo alkyl radicals having 5 to 25 carbon atoms;
(c) aralkyl and/or aryl radicals having 6 to 18 carbon atoms, and
(d) polymeric chains containing hetero atoms selected from polyether, polythioether, polyester, polycarbonate and polyacetal chains.

The amidine improves the stability of compositions comprising high and low molecular weight polyols.

9 Claims, No Drawings

COMPATIBLE ISOCYANATE REACTIVE COMPOUNDS

This invention relates to polyol blends and their use in the production of polymeric articles by the reaction injection moulding process and/or by various foaming techniques from reaction mixtures containing organic polyisocyanates and isocyanate-reactive components.

The production of moulded articles, for example automotive body parts or flexible foam moldings, from organic polyisocyanates and isocyanate-reactive components is well established. In such processes, two reactive liquid streams, one containing a polyisocyanate and the other containing isocyanate-reactive components, for example polyol and/or polyamines reactants, are mixed and rapidly injected into a mould cavity. High production rates of moulded polyurethane, polyurea and related polymeric articles having excellent physical properties can be achieved.

Whilst RIM and foam reactive processing is eminently suited to the mass production of isocyanate-based moulded articles, it is essential to successful and economic operation that the products be made quickly with repetitive uniformity. Therefore, the fast reacting ingredients normally used in this process must be fed into the mixer and mold at constant molar ratios. In order to achieve uniformity the preblends of reactive ingredients must be storage stable and compatible. A well known problem in maintaining uniformity is associated with making compatible blends of polyols or other isocyanate reactive ingredients comprising very low molecular weight materials with high molecular weight ingredients.

It has now been found that a superior compatibilizing effect can be obtained for incompatible polyol blends in the manufacture of polyurethane, polyurea and like polymers by processes such as the RIM process, when there is used as compatibilising material a compound or mixture of compounds selected among amidines of cyclic or acyclic form.

Therefore the present invention is concerned with an isocyanate-reactive composition having a plurality of isocyanate-reactive groups comprising:
(i) at least one polyol having a number average molecular weight of from 2000 to 12,000;
(ii) at least one low molecular weight polyol, including water, immiscible in said high molecular weight compound and having a molecular weight in the range of 18–500; and
(iii) a compatibilising amount of an amidine compound of the formula (1)

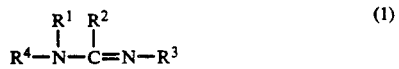

wherein each of $R^1$ to $R^4$ represent H or, independently or together, an organic radical selected from:
(a) alkyl radicals having 1 to 25 carbon atoms;
(b) cyclo alkyl radicals having 5 to 25 carbon atoms;
(c) aralkyl and/or aryl radicals having 6 to 18 carbon atoms; and
(d) polymeric chains containing hetero atoms selected from polyether, polythioether, polyester, polycarbonate and polyacetal chains.

The invention also provides for a blend of polyols having improved stability against phase separation comprising a compatibilising amount of a compound of Formula (1).

The present invention is also concerned with a reaction system for use in making a polymeric article, said system comprising a polyisocyanate composition and the above isocyanate-reactive composition according to the present invention.

Any two of the groups $R^1$ and $R^4$ can be joined together to form at least one non-aromatic ring, preferably a 5, 6 or 7 membered ring.

Amongst the alkyl radicals those having 1 to 6 carbon atoms are preferred. Amongst the aralkyl and aryl radicals benzyl, phenyl and phenylethyl are preferred. Amongst the radicals the aliphatic radicals are preferred.

Optionally, each of $R^1$ to $R^4$, when not H, may be further substituted with a additional amidine residue or group obtained by the removal of any one of $R^1$ to $R^4$ radicals from above formula (1) compound.

Preferred amidine compounds for use in the compositions of the invention contain from 1 to 4 such group(s).

It is preferred that the amidine compounds have molecular weights not greater than 1500, preferably in the range 60 to 600, for example 100 to 600.

The term "compatibiliser", as used herein, refers to an additive or reagent used to promote the formation of a stable dispersion, colloidal suspension and/or solution of the polyols used in the isocyanate reactive (resin) component of the mixing activated RIM or foam systems.

The compatibilising agents of the invention have the advantage of providing improved stability and control over reactivity (i.e. flow, gel time) of the isocyanate reactive ingredients at low concentrations.

The expression "a compatibilising amount" used herein means an amount of the amidine compound which is sufficient to provide a substantially stable solution or dispersion of isocyanate-reactive compound or compounds and/or improved stability to separation in a mixture comprising otherwise immiscible isocyanate-reactive ingredients. Clearly, this amount will vary depending on the relative molecular weights, the nature of the isocyanate-reactive compound and their relative proportions as well as on the specific structure of the amidine compounds. In general it refers to the amount needed to reduce the rate of phase separation of normally immiscible polyols which amount of amidine, is generally less than 1% by weight of the polyol blend and preferably 0.05–0.25% by weight.

The amidine compounds used as compatibilisers in the compositions of the invention are preferably capable of reacting with isocyanates, without the liberation of monomeric by-products.

The preparation of these amidine compounds in both cyclic and acyclic form is well known in the literature.

A general review of the preparation of amidines is given in "The Chemistry of amidines and imidates". Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine or any isomer of propanediamine in the presence of an acid catalyst. Alternatively these materials can be prepared by the combination of ethylendiamine, with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A Weissberg, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous 6 membered ring amidines—i.e. the tetrahydropyrimidines—can be achieved in a similar manner by the use of optionally substituted 1,3-propanediamine as the diamine component. Compounds such as diazabicyclononene (DBN) and diazabicyloundecene (DBU) are particularly effective as compatibilisers and are preferred.

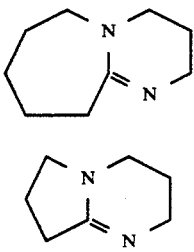

DBU

DBN

Specific methods are described in "The Chemistry of Heterocyclic Compounds: The Pyrimidines, Supplement 1", Ed. A. Weissberger and E. C. Taylor, author D. J. Brown, Interscience Publishers, New York, 1953.

Examples of especially suitable imidazolines and tetrahydro-pyrimidines for use in the composition of the invention include reaction products of above outlined carboxylic acids with ethylene diamine, 1,2-propylenediamine, 1,2-butylenediamine, N-methylelthylenediamine, N-ethyl-ethylenediamine, N-isopropylethylenediamine, 1,3-propylenediamine, 1,3-butanediamine, N-methyl-1,2-propylenediamine, N-methyl-1,3-propylenediamine, N-ethyl-1,3-propylene diamine.

Typical amidine compounds of cyclic form are: bisimidazolines derived from adiponitrile or adipic acid of following formula (2)

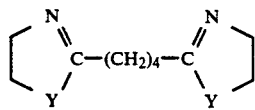 (2)

where Y is NH, N-R, or N-Ar;
R is a monovalent aliphatic organic group of 1 to 10 carbons and
Ar is an aromatic organic group of 6 to 18 carbons.

Mixtures of amidine compounds may be present in the composition, if desired.

Many useful polyol blends having limited miscibility are well known. It is especially difficult to form phase stable blends of low molecular weight polyols such as ethylene glycol and glycerine or water with polyols of high molecular weight (2000 and more) with functionality of 2-4. Blends of low molecular weight (LMW) polyols (18-500) including water with high molecular weight (HMW) (2000-12,000) are compatibilized at weight ratios (HMW/LMW) of 10:1-1:1 using 0.05-0.25% by weight of compounds of Formula (1) based on the total weight of the blend.

The polyol blend or isocyanate-reactive composition may be prepared by combining all the ingredients in a single operation (stirring and heating as necessary to provide complete compatibilisation) or, if desired, by pre-blends or concentrates of the formula (1) or (2) compounds and add an effective amount to the isocyanate-reactive ingredients to produce a compatible mix.

Polyols having molecular weights in the range from 2000 to 12,000 are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water, polyols, for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose, ammonia, primary monoamines, for example aniline or benzylamine, polyamines, for example ethylene diamine, hexamethylene diamine, toluene diamines, diaminodiphenylmethanes and polymethylene polyphenylene polyamines obtained by the condensation of aniline and formaldehyde, and aminoalcohols, for example ethanolamine and diethanolamine. Mixtures of initiators and/or cyclic oxides may be used.

Especially useful polyether polyols include polyoxypropylene and poly(oxyethylene-oxypropylene) diols and triols obtained by the simultaneous or sequential addition of ethylene and propylene oxides to appropriate di- or trifunctional initiators as fully described in the prior art. Mixtures of the said diols and triols are often particularly useful.

Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, polyether polyols, bis(hydroxyethyl) terephthalate, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterfication mixtures.

Polythioether polyols which may be used include products obtained by condensing thiodiglycol (either alone or with other glycols), with dicarboxylic acids, formaldehyde, alkylene oxides, aminocarboxylic acids, or combinations thereof.

Polycarbonate polyols which may be used include products obtained by reacting diols such as 1,3- propanediol, 1,4-butanediol, 1,6-hexanediol, diethylene glycol or tetraethylene glycol with diaryl carbonates, (for example diphenyl carbonate), with cyclic carbonates (i.e ethylene carbonate), or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated homo- and copolymers and suitable polysiloxane polyols include polydimethylsiloxane diols and triols, wherein the hydroxyl groups are organically bound.

The isocyanate-reactive composition according to the present invention may be used for preparing moulded products especially by the reaction injection moulding process and for preparing foams by reaction of this composition with a polyisocyanate together with the usual ingredients for making such moulded products and foams.

The isocyanate-reactive composition may comprise other high and low molecular weight isocyanate-reactive compounds like polyamines, imino-functional compounds, enamine containing compounds and mixtures thereof. Such compounds have been disclosed for these purposes before. Amongst the high molecular weight polyamines polyether polyamines are most preferred. High molecular weight imino-functional and enamine containing compounds have been described in U.S. Pat. No. 4,794,129 and European Patent Application 361703 respectively.

Preferably the high molecular weight isocyanate-reactive compounds have a molecular weight of 2000 to 8000 and an isocyanate-reactive functionality of 2 to 4 and preferably of 2 to 3. Further chain extenders, the name used in the art for low molecular weight isocyanate-reactive compounds, may be selected from polyamines like 3,5-diethyl-2,4-toluene diamine, 3,5-diethyl-2,6-toluene diamine, 4,4' and 2,4'-diamino diphenylmethanes, ethylene diamine and polyether diamines, and from imino-functional compounds such as those described in U.S. Pat. No. 4,794,129 and enamines.

Polyisocyanate compositions which may be reacted with the isocyanate-reactive compositions of the invention in the moulding process may include any of the aliphatic, cycloaliphatic, araliphatic or aromatic polyisocyanates known in polyurethane or polyurea chemistry, especially those that are liquid at room temperature.

Examples of suitable polyisocyanates include 1,6-hexamethylene diisocyanate, isophorone diisocyanate, cyclohexane-1,4-diisocyanate, 4,4'-dicyclo-hexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates (crude MDI) and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process.

The reaction systems of the invention may also contain other conventional ingredients of such systems, said ingredients usually being present in the isocyanate-reactive compositions of the invention. Such ingredients include catalysts, for example tin compounds and tertiary amines; surface-active agents and foam stabilisers, for example siloxane-oxyalkylene copolymers, blowing agents, for example water and low boiling halogenated hydrocarbons, internal mold release agents, flame retardants, plasticisers, dyes, fillers and reinforcing agents.

In the moulding and/or foaming process, the techniques, the relative proportions of the ingredients used and equipment used may be those that have been fully described in the prior art. RIM processes which may be used include structural (including mat-reinforded) RIM, amine extended RIM processes and "spray" RIM processes. Foams may be poured-in-place; free rise; slabstock; molded; or sprayed.

The invention is illustrated but not limited by the following Example wherein all proportion are on a parts by weight basis unless otherwise stated.

EXAMPLE

This example demonstrates improvements in the stability of blends of immiscible polyols achieved through the use of an amidine additive. Preparations were made by hand mixing of various blends of "Polyol A", which is an ethylene oxide (EO) capped polyoxypropylene triol (M.W.=6000) commercially available from Union Carbide as E-474, with ethylene glycol or glycerine in weight ratios of 4:1 and 5:1 (Triol/glycerine or ethylene glycol) and 0.05% or 0.1% by weight (relative to the blend) of diazabicycloundecene (DBU).

Stability of these solutions/suspensions is measured by visual inspection as shown in Table I.

TABLE 1

| | (parts by weight) | | | |
| --- | --- | --- | --- | --- |
| "Polyol A" | Ethylene Glycol | Glycerol | DBU | Time to Phase Separation* |
| 80 | 20 | — | 0 | 4 hours |
| 80 | 20 | — | 0.05 | 9 weeks |
| 80 | 20 | — | 0.1 | 9.5 weeks |
| 83.5 | 16.5 | — | 0 | 4.5 hours |
| 83.5 | 16.5 | — | 0.05 | 9.5 weeks |
| 83.5 | 16.5 | — | 0.1 | 10 weeks |
| 80 | — | 20 | 0 | 4 days |
| 80 | — | 20 | 0.05 | 12 weeks |
| 80 | — | 20 | 0.1 | 12.2 weeks |
| 83.5 | — | 16.5 | 0 | 4 days |
| 83.5 | — | 16.5 | 0.05 | 12 weeks |
| 83.5 | — | 16.5 | 0.1 | 12.5 weeks |

*storage at 20° C. under nitrogen.

I claim:
1. An isocyanate-reactive composition having a plurality of isocyanate-reactive groups comprising:
   (i) at least one polyol having a number average molecular weight of from 2000 to 12,000;
   (ii) at least one member of the group consisting of low molecular weight polyol and water, immiscible in said high molecular weight compound and having a molecular weight in the range of 18–500; and
   (iii) a compatibilising amount of an amidine compound of the Formula (1)

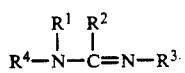

(1)

wherein each of $R^1$ to $R^4$ represents H or, independently or together, an organic radical selected from:
- (a) alkyl radicals having 1 to 25
- (b) cyclo alkyl radicals having 5 to 25 carbon atoms;
- (c) aralkyl and/or aryl radicals having 6 to 18 carbon atoms,
- (d) the atoms necessary to complete a heterocyclic ring with one or both the N-atoms; and
- (e) polymeric chains containing hetero atoms selected from polyether, polythioether, polyester, polycarbonate and polyacetal chains.

2. A composition according to claim 1 wherein the compound of Formula (1) contains 1 to 4 amidine groups.

3. A composition according to claim 1 wherein said amidine of Formula (1) is an imidazoline, a bis-imidazoline, a tetrahydropyrimidine or a bis-tetrahydropyrimidine.

4. A composition according to claim 1 wherein the compound of Formula (1) has a molecular weight not exceeding 1500.

5. A composition of claim 1 wherein the compound of Formula (1) is selected from diazabicycloundecene and diazabicyclononene of the structure:

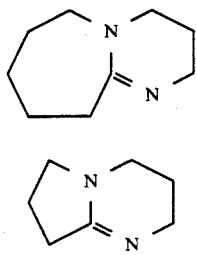

DBU

DBN

6. An isocyanate-reactive composition according to claim 1 wherein
(i) is a polyether polyol, and
(ii) is selected from glycerine and ethylene glycol.

7. A reaction system for use in making a polymeric article, said system comprising:
(1) a polyisocyanate composition, and
(2) an isocyanate-reactive composition according to claim 1.

8. A blend of polyols, said blend having improved stability to separation, comprising a compatibilising amount of a compound of Formula (1)

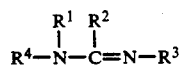

(1)

wherein each of $R^1$ to $R^4$ represents H or, independently or together, an organic radical selected from:
(a) alkyl radicals having 1 to 25 carbon atoms;
(b) cyclo alkyl radicals having 5 to 25 carbon atoms;
(c) aralkyl radicals and/or aryl radicals having 6 to 18 carbon atoms;
(d) polymeric chains selected from polyether, polythioether, polyester, polycarbonate, polyacetal chains.

9. A blend according to claim 8 wherein the compound of Formula (1) is selected from diazabicycloundecene and diazabicyclononene having the structures:

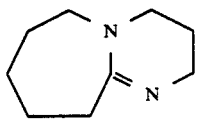

DBU

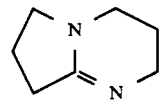

DBN

* * * * *